United States Patent [19]
Young

[11] Patent Number: 5,941,470
[45] Date of Patent: Aug. 24, 1999

[54] FISHING REEL OSCILLATION SYSTEM

[75] Inventor: John Newton Young, Fairfax, Calif.

[73] Assignee: Charles C. Worth Corporation, San Rafael, Calif.

[21] Appl. No.: 08/924,784

[22] Filed: Sep. 5, 1997

[51] Int. Cl.⁶ ................................................ A01K 89/01
[52] U.S. Cl. ........................................................... 242/242
[58] Field of Search ............................ 242/230, 241, 242/242

[56] References Cited

U.S. PATENT DOCUMENTS

| | | |
|---|---|---|
| 4,416,428 | 11/1983 | Noda ........................................ 242/241 |
| 4,618,107 | 10/1986 | Nakajima . |
| 4,773,611 | 9/1988 | Kaneko . |
| 4,892,267 | 1/1990 | Webb ........................................ 242/228 |

*Primary Examiner*—John P. Darling
*Attorney, Agent, or Firm*—Virginia H. Meyer, Esq.

[57] ABSTRACT

A fishing reel oscillation system having a rotating pawl oscillation assembly whose components are integrated into a standard fishing reel mechanism wherein a pawl attached to a pinion rotates around a main shaft with a lead-screw recess track, causing the shaft and an attached spool to oscillate along the rotational axis of the spool. The pinion is also coupled to a rotor. In this manner, one integrated mechanism effects both the oscillation of the spool and the spinning of the rotor.

15 Claims, 4 Drawing Sheets

FISHING REEL OSCILLATION SYSTEM

FIELD OF THE INVENTION

The present invention relates to a fishing reel that winds fishing line on a spool. More particularly, the present invention relates to a fishing reel having an oscillation mechanism moving a spool to effect level winding of fishing line as the rotor moves about the spool.

BACKGROUND OF THE INVENTION

The use of reciprocating mechanisms on fishing reels to effect controlled winding of line on associated spools is known. These mechanisms are referred to in the art as oscillation systems. Prior art oscillation systems are based on cammed, geared, or lead-screw driven mechanisms that are linked in a variety of manners to the turning of the fishing reel handle. The present invention employs the lead-screw actuation method. Accordingly, other oscillation methods will not be discussed.

Lead-screw oscillation systems share a common characteristic in that they all have an eared pawl slidably engaged to a lead-screw defined by a recessed track integral to a rotating shaft. The ears of the pawl travel within and are guided by the track such that as the lead-screw rotates, the oscillation pawl is forced to move reciprocally and in fixed radial alignment to the lead-screw as the lead-screw shaft rotates.

Prior art lead-screw devices employ many different methods, but generally link lead-screw rotation with the turning of the reel handle. These prior art methods are usually complicated and expensive to manufacture. U.S. Pat. No. 4,773,611 issued to Kaneko teaches a conventional lead-screw oscillation system. The accepted advantages of lead-screw oscillation systems, however, justify their usual cost and complexity.

The majority of known lead-screw oscillation systems employ a rotating lead-screw as described above. There is no mechanical dictate in lead-screw oscillation designs, however, for the lead-screw to rotate while the pawl moves axially along the lead-screw. Accordingly, it is mechanically acceptable to have a pawl rotate around a sliding, non-rotating lead-screw to effect the same reciprocating movement. Such a prior art fishing reel is disclosed in U.S. Pat. No. 4,618,107 issued to Nakajima. Nakajima teaches the use of a rotating pawl that moves about a sliding, non-rotating lead-screw. To this end, Nakajima teaches the use of a first drive mechanism to rotate the pawl around the oscillation drive track to effect oscillation and a second drive mechanism to turn the rotor to wind the line around the spool. The additional components of the separate drive mechanisms add to the complexity and cost of the reel.

Therefore, it can be appreciated that a need exists for a new fishing reel oscillation system having a low cost design and ease of manufacture while maintaining all the accepted advantages of conventional lead-screw oscillation designs. More specifically, a need exists for a rotating pawl lead-screw oscillation system that obviates the need for separate oscillation assemblies required by prior art designs.

SUMMARY OF THE INVENTION

The present invention provides a fishing reel oscillation system having a rotating pawl oscillation assembly whose components are integrated into the standard components of a fishing reel mechanism. More specifically, the present invention provides a fishing reel oscillation system wherein a pawl carried by a pinion rotates around a main shaft with a lead-screw recess track, causing the main shaft and an attached spool to oscillate. The fishing reel oscillation system of the present invention generally comprises a reel body having a bushing, a main gear journalled into the reel body, a main shaft rotationally, but not slidably fixed in the bushing of the reel body, a lead-screw track defined on the main shaft, a tubular pinion gear journalled into the reel body, a pawl attached to the tubular pinion gear such that the pawl engages the lead-screw track of the main shaft, a rotor fixed to the pinion gear, and a spool attached to the main shaft. When the fisherman rotates the handle, the main gear turns the pinion, pawl, and rotor as a single unit around the main shaft. The bushing in the reel body prevents the main shaft from rotating as the pawl travels in the lead-screw track around the main shaft. As the pawl rotates, it rides within the lead-screw track and presses the main shaft continuously in one axial direction and then in a reversed axial direction for as long as the handle is cranked. As the main shaft oscillates, the attached spool is carried in corresponding oscillation to effect level winding of fishing line.

Another embodiment of the present invention generally comprises a reel body having a bushing, a main gear journalled into the reel body, a main shaft rotationally but not slidably fixed in the bushing of the reel body, a lead-screw track defined on the main shaft, a tubular pinion gear journalled into the reel body and in constant engagement with the main gear, a rotor attached to the pinion, a pawl attached to the rotor and in constant engagement with the lead-screw track, and a spool fixed to the main shaft. Again, the lead-screw track is configured such that the main shaft oscillates axially as the rotor and attached pawl rotates about the main shaft and lead-screw track.

OBJECTS OF THE INVENTION

It is an object of the present invention to provide a lead-screw oscillation system that is of low cost design and simple to manufacture, while maintaining all the accepted advantages of conventional lead-screw oscillation designs.

It is another object of the present invention to provide a more efficient and less complex lead-screw oscillation system by obviating the need for separate oscillation assembly components.

It is yet another object of the present invention to provide a fishing reel oscillation system having a reduced total body volume by eliminating the components required by conventional oscillation systems.

It is yet a further object of the present invention to provide a fishing reel oscillation system capable of being applied in fishing reel systems with main and pinion gears having an offset rotational axis, thereby permitting application in conventional fishing reels with right/left side handle function.

It is yet another object of the present invention to provide a fishing reel oscillation mechanism that is capable of being manufactured by the modification of standard fishing reel drive components allowing the use of existing mountings, journals, and mechanisms and thereby reducing cost and space requirements associated with conventional fishing reel oscillation mechanisms.

Still another object of the present invention is to efficiently and effectively protect the oscillation mechanism from abrasive contaminants, such as dirt and sand, that wear the operating surfaces of the oscillation mechanism.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 2a and 2b are expanded sectional views of the lead-screw track and rotating pawl engagement of the first preferred embodiment, illustrating the protection the pinion gear provides the lead-screw track from contaminants, during the full range of main shaft oscillation.

FIG. 4a is an expanded sectional view of the lead-screw track and rotating pawl mechanism of the second preferred embodiment; and, FIG. 4b is a perspective view of the lead-screw assembly of the second preferred embodiment.

The same reference numerals refer to the same parts throughout the various Figures.

DESCRIPTION OF A FIRST PREFERRED EMBODIMENT

Figure 1:
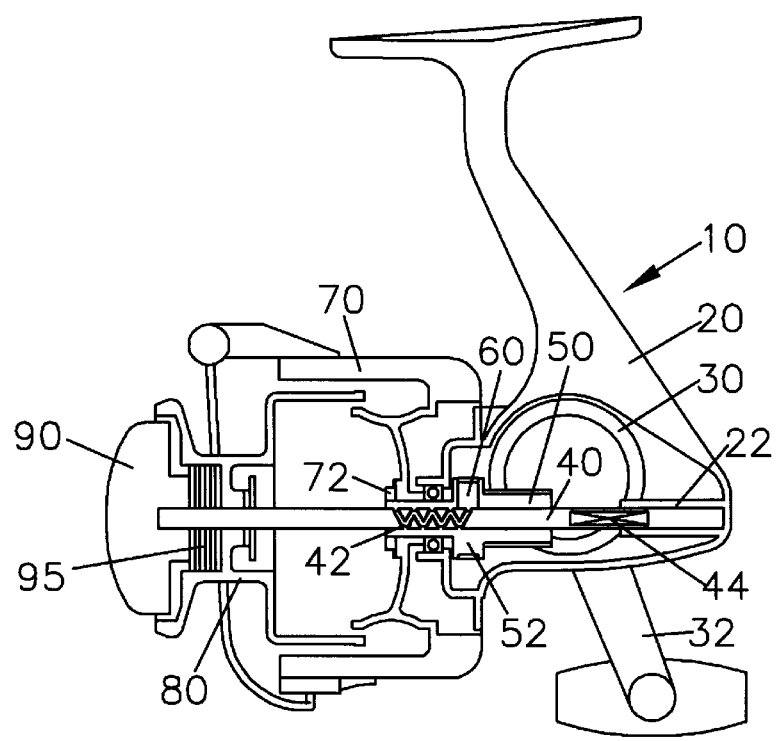
FIG. 1 is a cutaway view of a fishing reel of a first preferred embodiment of the present invention.
Figure 2A:
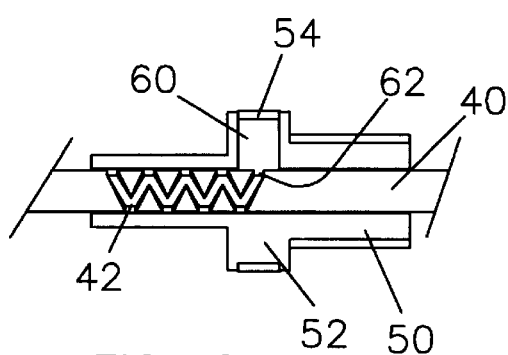
FIGS. 2a and 2b.
Figure 2B:
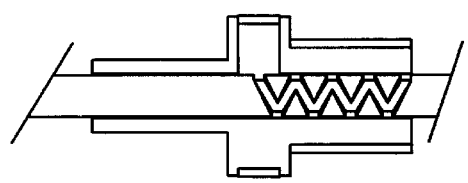

Referring to FIGS. 1, 2a, and 2b, a first preferred fishing reel having an oscillation system of the present invention is shown and designated by the number 10. Fishing reel 10 generally comprises reel body 20, main gear 30, main shaft 40, pinion gear 50, pawl 60, rotor 70, and spool 80. As shown in FIG. 1, main gear 30 journals into reel body 20 as is conventional in fishing reels. In use, main gear 30 is fixed to and rotated by handle 32. Pinion gear 50 journals into reel body 20 and engages main gear 30 as is conventional in the art. When handle 32 is cranked, pinion gear 50 rotates in a conventional manner by gear faces engaged between pinion gear 50 and main gear 30. Pinion gear 50 is fixed to rotor 70 in a conventional manner by a key therebetween and by rotor nut 72. Spool 80 is affixed to main shaft 40 in a conventional manner by drag knob 90 through drag assembly 95. Main shaft 40 is shaped to have lead-screw track 42 formed therein.

Pinion gear 50 is formed with collar 52 integral therewith. Collar 52 contains a bore hole therethrough to support pawl 60 in pivotal alignment with lead-screw 42 at ear 62. Spring retainer 54 circumscribes collar 52 in a shallow groove there around and presses the pawl in constant alignment in lead-screw track 42. The bore hole in collar 52 is configured such that the bore hole engages pawl 60 while allowing pawl 60 to rotate about its axis as ear 62 travels within lead-screw track 42.

Main shaft 40 is also formed with a keyed surface 44 that is held slidably but not rotatably in bushing 22 of reel body 20. In the first preferred embodiment, bushing 22 is integrally formed with reel body 20. In other embodiments, bushing 22 may be separately formed and subsequently attached to reel body 20 by any suitable means such as screws, and the like. In yet other embodiments, other means can be used to prevent the main shaft from turning, while stilling allowing axial movement of the main shaft. For instance, the main shaft may include a pin extending therethrough that engages track slides attached to the reel body.

When the fisherman rotates handle 32, main gear 30 turns pinion 50, pawl 60 and rotor 70 as a single unit. Bushing 22 in reel body 20 prevents main shaft 40 from rotating as pawl 60 travels around main shaft 40. As pawl 60 is rotated, it rides within lead-screw track 42 and presses main shaft 40 continuously in one axial direction and then in a reversed axial direction for as long as handle 32 is cranked. As main shaft 40 is oscillated in a series of reversed directions, spool 80 is carried in a corresponding oscillation.

In the first preferred embodiment, the oscillation of the main shaft is integral with the rotation of the pinion. The pinion gear turns both the rotor and the oscillation drive mechanism to oscillate the main shaft. Thus, the components of the oscillation assembly are greatly reduced relative to the devices of the prior art. Further, in preferred embodiments, the lead-screw is positioned axially on the main shaft so as to never leave the protection of the pinion gear through which it passes or the inside of the reel body which is sealed from water or other harmful materials. Furthermore, as FIGS. 2a and 2b illustrate, the lead screw track remains covered and protected by the pinion gear during the full range of main shaft oscillation.

Figure 5:
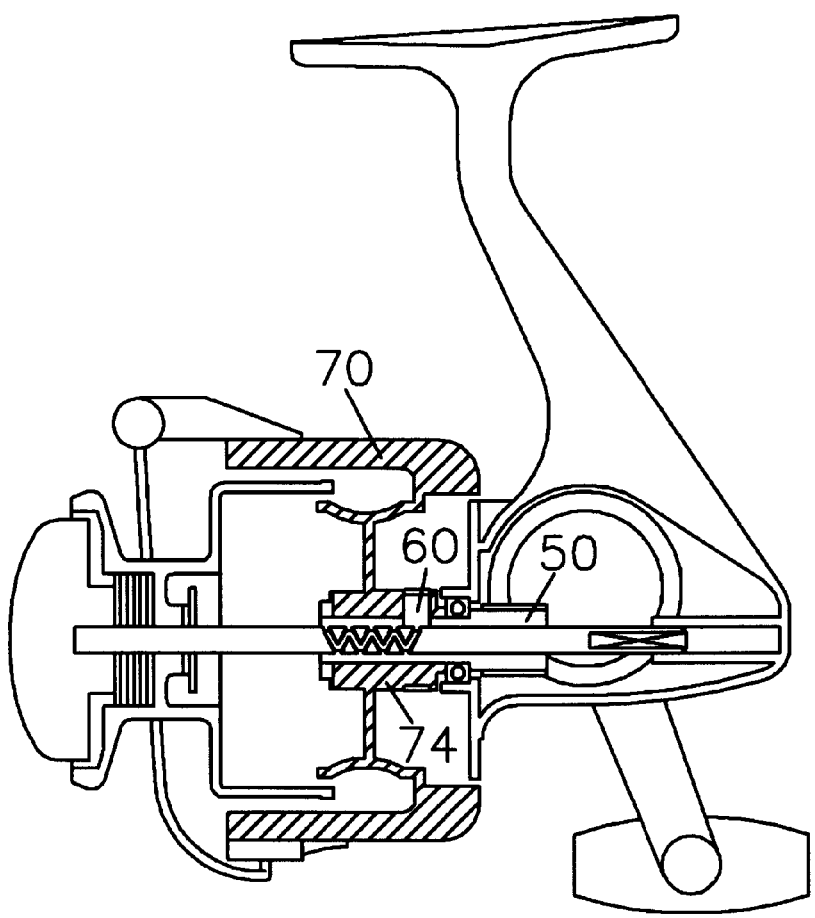
FIG. 5 is a cutaway view of a fishing reel of a third preferred embodiment of the present invention.

Alternatively, FIG. 5 shows an alternate embodiment of the present invention. As shown in FIG. 5 both pinion 50 and rotor 70 have corresponding holes into which pawl 60 is positioned. More specifically rotor 70 has collar 74 having a bore hole. Pinion gear 50 also has a bore hole corresponding to the bore hole in collar 74 of rotor 70. As described above, pawl 60 is placed in the bore holes of pinion 50 and rotor 70 and held in operable engagement with lead-screw track 42 by spring retainer 54.

DESCRIPTION OF A SECOND PREFERRED EMBODIMENT

In the second preferred embodiment, the rotor carries the pawl that engages a lead-screw track to effect oscillation of the spool. More specifically, the second preferred embodiment features a conventional rotor that has been adapted to carry a pawl around the main shaft in operable engagement with the lead screw track. The second preferred embodiment also features a lead-screw assembly having a lead-screw track extending from a spool hub. The lead-screw assembly is fixed to the main shaft. In an alternative embodiment, the main shaft can be formed to include an integral lead-screw and spool hub assembly thereby obviating the need for attachment pins.

Figure 3:
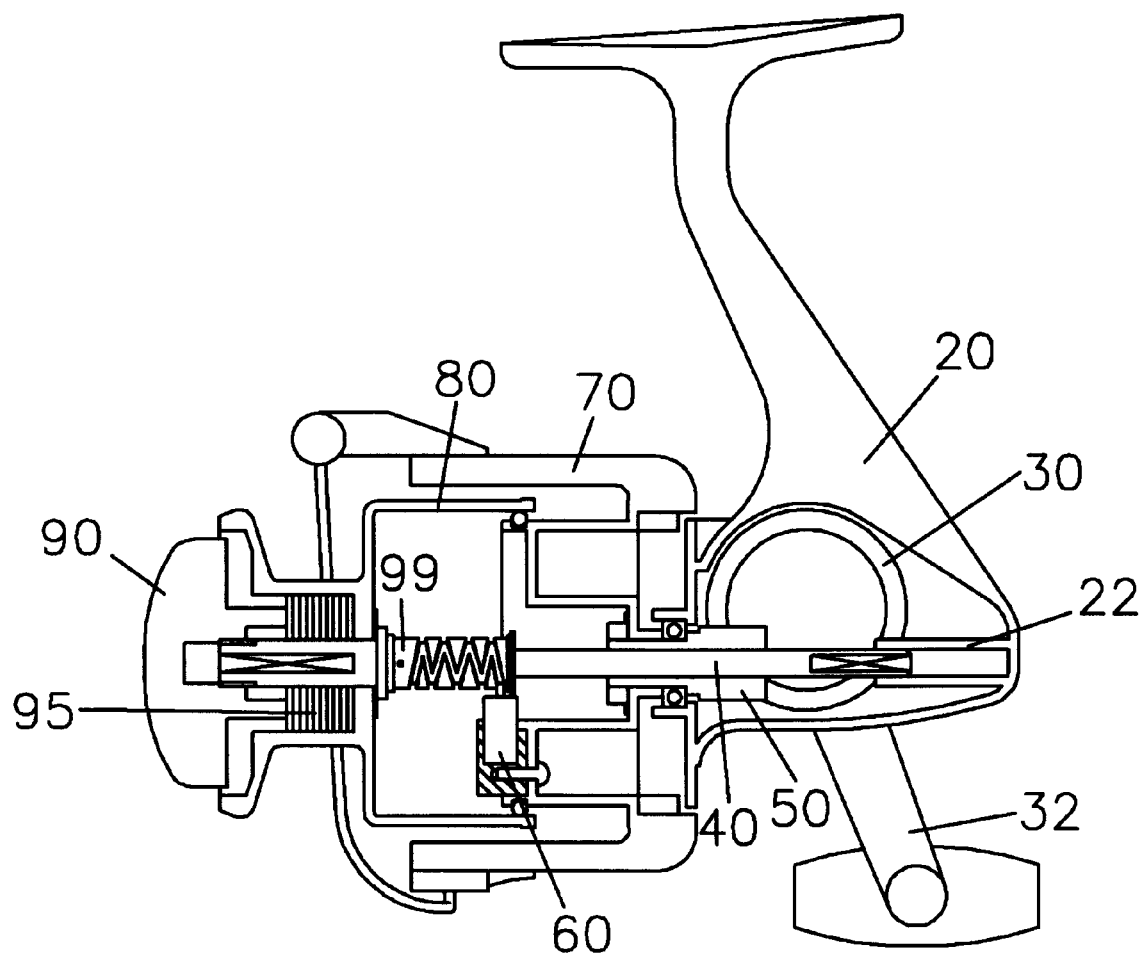
FIG. 3 is a cutaway view of a second preferred fishing reel of the present invention.

The fishing reel drive mechanism of the second preferred embodiment is conventional in the art. As shown in FIG. 3, main gear 30 journals into fishing reel body 20. Main gear 30 is also fixed to and rotated by handle 32. Pinion gear 50 journals into reel body 20 and is rotated by main gear 30 in a conventional manner by gear faces engaged therebetween. Pinion gear 50 is fixed to rotor 70 in a conventional manner by a key therebetween and rotor nut 72. Main shaft 40 is rotationally, but not slidably fixed in reel body 20 by bushing 22. As shown in FIG. 3, main shaft 40 extends through pinion gear 50 and rotor 70.

Figure 4A:
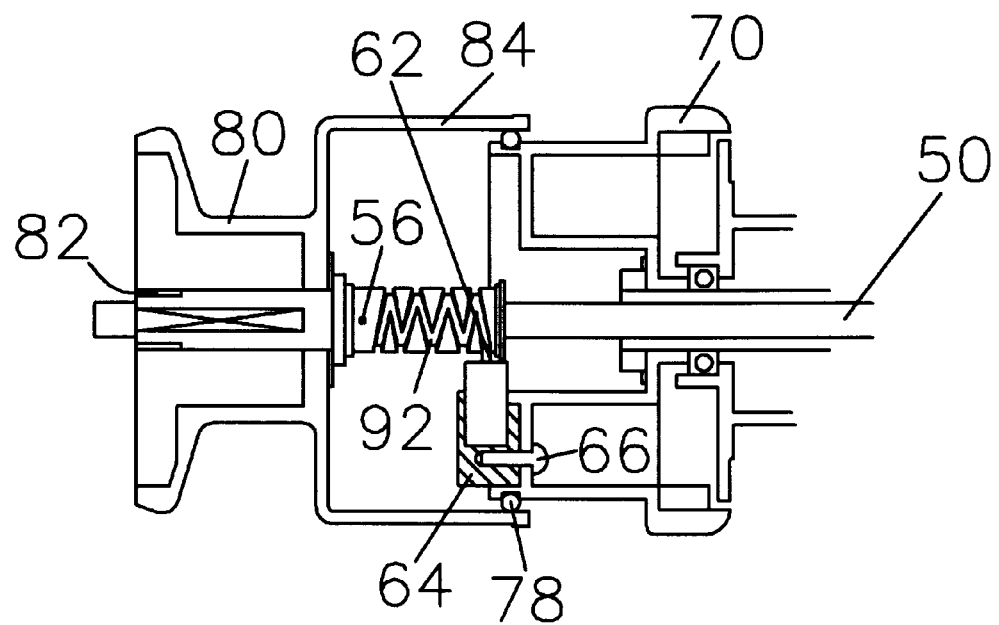
FIGS. 4a and 4b.
Figure 4B:
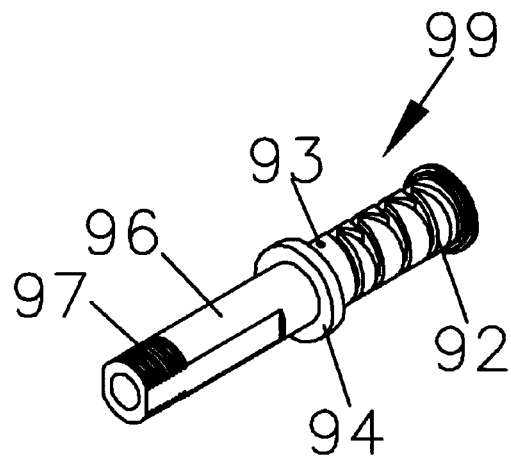

As FIGS. 3, 4a, and 4b illustrate, the oscillation mechanism of the present invention is formed by the modification of the convention drive mechanism discussed above. As shown in FIGS. 4a and 4b, lead-screw assembly 99 comprises lead-screw track 92, annular lip 94, and spool hub 96. Spool hub 96 includes threaded region 97.

Spool 80 has hole 82 which mates with spool hub 96. Lead-screw track 92 further has hole 93 corresponding to a hole in main shaft 40 (not shown). Lead-screw assembly 99 is fixed to main shaft 40 by pin 56 inserted into hole 93 and through main shaft 40.

Spool 80 frictionally engages spool hub 96 and thereby operationally attaches to main shaft 50 in a conventional manner by a conventional drag assembly 95 having standard friction washers.

Pawl 60 is secured pivotally in pawl block 64 with ear 62 pressed into and aligned in lead-screw track 92. Pawl block 64 is fixed to rotor 70 by screw 66. Rotor 70 is formed to have an annular groove 76 which retains a sealing ring 78. Sealing ring 78 is sized to span the distance between the rotor 70 and spool skirt 84, so as to seal the conventional chamber formed between the rotor and the spool both from contaminants or particles harmful to the lead-screw and to the accidental intrusion of fishing line.

When the fisherman rotates the handle, the main gear rotates the pinion, the rotor, the pawl block and pawl as a single unit. As the pawl rotates, it presses against the recessed track of the lead-screw which causes the main shaft to oscillate for as long as the handle is rotated. Because the spool is fixed to the main shaft, it oscillates with the main shaft to effect level line winding in a conventional manner as the rotor turns around the spool. Further, since conventional fishing reel spools are easily removed by hand, in the event that a pawl breaks or must be lubricated, the second embodiment features easy access to the pawl by simply removing the spool.

SUMMARY

With respect to the above description then, it is to be realized that the optimum dimensional relationships for the parts of the invention, to include variations in size, materials, shape, form, function and the manner of operation, assembly and use, are deemed readily apparent and obvious to one skilled in the art. Accordingly, all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Therefore, all suitable modifications and equivalents which may be resorted to fall within the scope of the invention.

I claim:

1. A fishing reel comprising:
   a reel body,
      said reel body having a bushing means,
   a main gear journalled into said reel body,
   a main shaft,
      said main shaft having a first end and a second end,
      said main shaft rotationally but not slidably fixed at said first end in said bushing means of said reel body,
      said main shaft having a lead-screw track defined thereon,
   a tubular pinion gear,
      said tubular pinion gear journalled into said reel body and in constant engagement with said main gear,
      said tubular pinion gear having a hole extending therethrough at the rotational axis thereof,
   said main shaft extending through said hole of said pinion gear,
   a rotor,
      said rotor fixed to said pinion gear,
   a pawl attached to said rotor and in constant engagement with said lead-screw track, and
   a spool,
      said spool fixed to said main shaft,
   said lead-screw track configured such that said main shaft oscillates axially as said pawl rotates about said lead-screw track.

2. The fishing reel according to claim 1 further including a pawl block attached to said rotor, and wherein said pawl block holds said pawl in operable engagement with said lead-screw track.

3. The fishing reel according to claim 1 wherein said bushing means is integrally formed with said reel body.

4. A fishing reel comprising:
   a reel body,
      said reel body having a bushing means,
   a main gear journalled into said reel body,
   a main shaft,
      said main shaft having a first end and a second end,
      said main shaft rotationally but not slidably fixed at said first end in said bushing means of said reel body,
   a tubular pinion gear,
      said tubular pinion gear journalled into said reel body and in constant engagement with said main gear,
      said tubular pinion gear having a hole extending therethrough at the rotational axis thereof,
   a lead-screw assembly fixed to said main shaft,
      said lead-screw assembly having a lead-screw track and a spool hub extending therefrom,
   said main shaft extending through said hole of said pinion gear,
   said main shaft extending through said lead-screw assembly,
   a rotor,
      said rotor fixed to said pinion gear,
   a pawl attached to said rotor and in constant engagement with said lead-screw track,
   a spool,
      said spool having a hole extending therethrough at the rotational axis thereof,
   said spool hub extending through said hole of said spool, and,
   a drag assembly frictionally engaging said spool hub to said spool,
   said lead-screw track configured such that said main shaft oscillates axially as said pawl rotates about said lead-screw assembly.

5. The fishing reel of claim 4 further comprising a pin, and wherein said main shaft has a hole therethrough and said lead-screw assembly has a second hole therethrough corresponding to said hole in said main shaft, wherein said pin is pressed into said hole of said lead-screw assembly and said hole of said main shaft to thereby fix said lead-screw assembly to said main shaft.

6. The fishing reel of claim 4 wherein said lead-screw assembly further comprises an annular lip between said spool hub and said lead-screw track.

7. The fishing reel of any of claims 4, 5, or 6 wherein said drag assembly includes a drag knob, and wherein said spool hub has threads thereon at the end opposite said lead-screw track whereby said drag knob engages said threads of said spool hub to adjust said frictional engagement between said spool hub and said spool.

8. A fishing reel comprising:

a reel body,
   said reel body having a bushing means, a main gear journalled into said reel body, a main shaft,
   said main shaft having a first end and a second end,
   said main shaft rotationally, but not slidably fixed at said first end in said bushing means of said reel body,
   said main shaft having a lead-screw track thereon, a tubular pinion gear,
   said tubular pinion gear journalled into said reel body and in constant engagement with said main gear,
   said tubular pinion gear having a hole extending therethrough at the rotational axis thereof, said main shaft extending through said hole of said pinion gear, a pawl attached to said tubular pinion gear such that said pawl engages said lead-screw track of said main shaft, a rotor,
   said rotor fixed to said pinion gear, and a spool,
   said spool attached to said second end of said main shaft, said lead-screw track defined such that said main shaft and said spool oscillate axially as said tubular pinion gear and said attached pawl rotate about said main shaft wherein pawl engages said lead-screw track, and said lead-screw track of said main shaft is positioned on said main shaft such that said lead-screw track remains covered by said pinion gear throughout the entire range of oscillation of said main shaft.

9. The fishing reel according to claim 8 wherein said pinion gear has a second hole substantially perpendicular to the rotational axis of said pinion gear, and wherein said pawl is positioned and retained in said second hole to engage said lead-screw track of said main shaft.

10. The fishing reel according to claim 9 wherein said second hole in said pinion gear is configured such that said pawl is allowed to rotate about the axis thereof within said second hole as said pawl passes through said lead-screw track.

11. The fishing reel according to claim 10 further comprising a spring retainer circumscribing said pinion gear over said second hole and said pawl whereby said pawl is retained in said second hole.

12. The fishing reel according to claim 9 further comprising a spring retainer circumscribing said pinion gear over said second hole and said pawl whereby said pawl is retained in said second hole.

13. The fishing reel according to claim 9 wherein said pinion gear extends through at least a portion of said rotor, wherein said rotor has a collar attached thereto and a third hole in said collar and corresponding to said second hole of said pinion gear, and wherein said pawl is positioned and retained in said second hole of said pinion gear and said third hole of said collar.

14. The fishing reel according to claim 13 further comprising a spring retainer circumscribing said collar of said rotor and said pinion gear over said second and third holes and said pawl whereby said pawl is retained in said second and third holes.

15. The fishing reel according to claim 8 wherein said bushing means is integrally formed with said reel body.

\* \* \* \* \*

UNITED STATES PATENT AND TRADEMARK OFFICE
CERTIFICATE OF CORRECTION

PATENT NO.   : 5,941,470
DATED        : Aug. 24, 1999
INVENTOR(S)  : John Newton Young It is certified that error appears in the above-identified patent and that said Letters Patent is hereby corrected as shown below:

*In the drawing*:

In Figure 4a: "50" should read –40–.

Column 4, lines 17, 18 and 19: "The pinion gear turns both the rotor and the oscillation drive mechanism to oscillate the main shaft." should read –Pinion gear 50 turns both rotor 70 and the oscillation drive mechanism to oscillate main shaft 40–.

Column 4, line 22, "the lead-screw" should read –lead-screw 42–.

Column 4, line 22, "the main shaft" should read –main shaft 40–.

Column 4, line 23, "the pinion gear" should read –pinon gear 50–.

Column 4, line 24, "the reel body" should read –reel body 20–.

Column 4, line 26, "the lead screw" should read –lead-screw track 42–.

Column 4, line 27, "the pinion gear" should read –pinon gear 50–.

Column 4, line 28, insert –40– before oscillation.

Column 4, line 37, insert –(please refer to Figure 2a for a showing of lead-screw track 42 and spring retainer 54)– after 54.

UNITED STATES PATENT AND TRADEMARK OFFICE
CERTIFICATE OF CORRECTION

PATENT NO. : 5,941,470
DATED : Aug. 24, 1999
INVENTOR(S) : John Newton Young

It is certified that error appears in the above-identified patent and that said Letters Patent is hereby corrected as shown below:

Column 4, line 61, insert –(please refer to Figure 1 for a showing of rotor nut 72)– after 72.

Column 5, line 1, "Figs. 4a and 4b" should read –Fig. 4b.–

Column 5, line 17, delete "the" after between.

Column 5, line 19, "the rotor and the spool" should read –rotor 70 and spool 80–.

Column 5, line 22, "the handle, the main gear" should read –handle 32, main gear 30–.

Column 5, line 23, "the pinion, the rotor, the pawl block and pawl" should read –pinion 50, rotor 70, pawl block 64 and pawl 60–.

Column 5, line 24, "the pawl" should read –pawl 60–.

Column 5, line 25, "the main shaft" should read –main shaft 40–.

Column 5, line 26, "the handle" should read –handle 32–.

UNITED STATES PATENT AND TRADEMARK OFFICE
CERTIFICATE OF CORRECTION

PATENT NO. : 5,941,470
DATED : Aug. 24, 1999
INVENTOR(S) : John Newton Young

It is certified that error appears in the above-identified patent and that said Letters Patent is hereby corrected as shown below:

Column 5, lines 26-29: "Because the spool is fixed to the main shaft, it oscillates with the main shaft to effect level line winding in a conventional manner as the rotor turns around the spool." should read –Because spool 70 is fixed to main shaft 40, it oscillates with main shaft 40 to effect level line winding in a conventional manner as rotor 70 turns around spool 80.–.

Signed and Sealed this

Twenty-first Day of November, 2000

*Attest:*

Q. TODD DICKINSON

*Attesting Officer*  *Director of Patents and Trademarks*